Patented Oct. 31, 1944

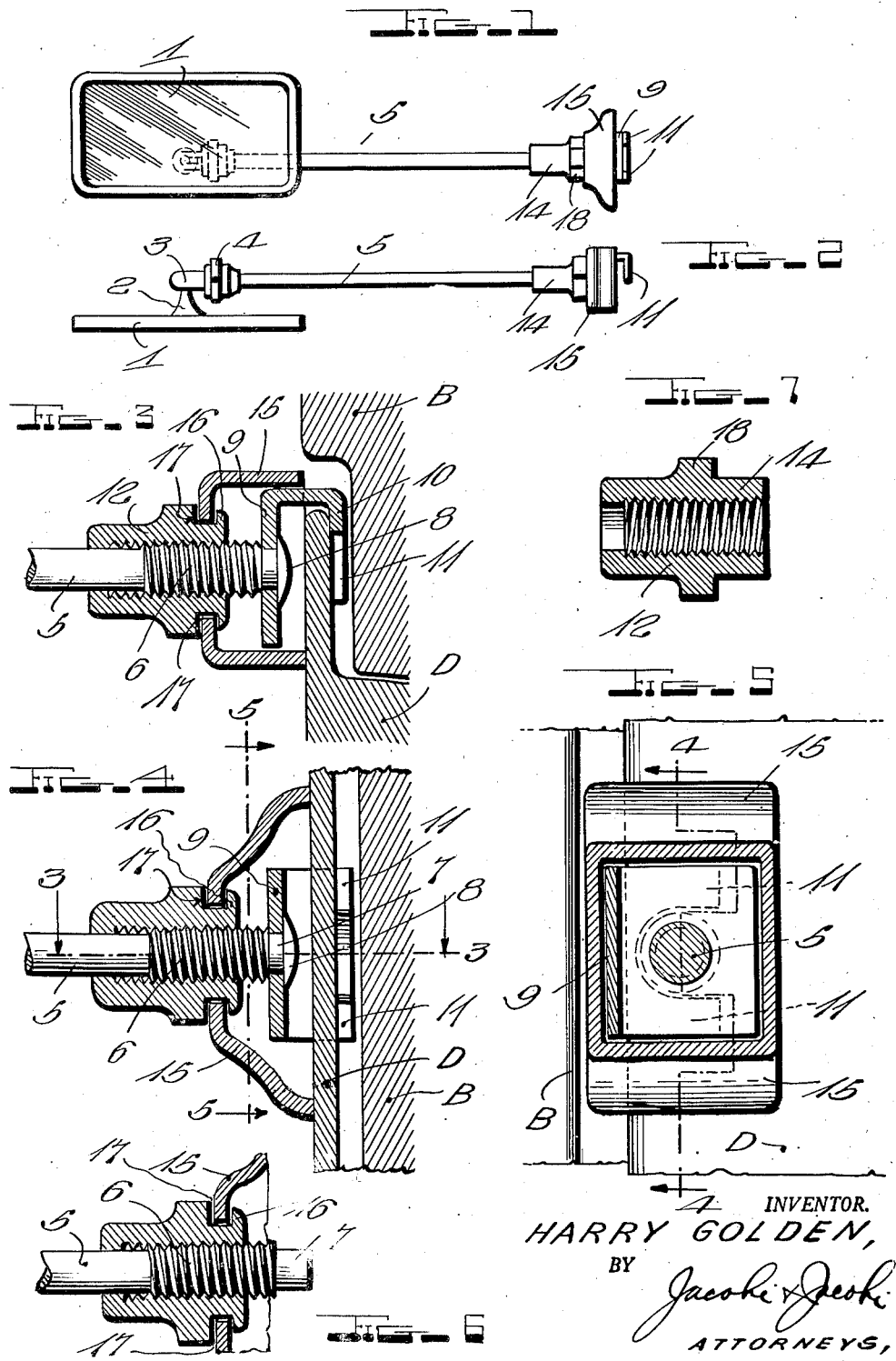

2,361,764

UNITED STATES PATENT OFFICE 2,361,764

AUTO MIRROR BRACKET

Harry Golden, New York, N. Y.

Application June 15, 1944, Serial No. 540,523

1 Claim. (Cl. 248—226)

My invention relates to new and useful improvements in automobile mirror brackets attachable to the body of a car to extend a rear view mirror outwardly therefrom, the primary object of the invention being to provide a bracket which may be quickly and readily applied without damaging the body and removed at will.

A further object of the invention resides in providing a bracket with few and simple parts so assembled as to prevent the loss of any of such parts when the device is not in use on the automobile.

A still further object of the invention resides in providing a device of the character mentioned which is simple and durable in construction, comparatively inexpensive to manufacture and one which will be very efficient and useful in operation.

With these and numerous other objects in view, my invention consists in the novel features of construction, combination and arrangement of parts as will be hereinafter referred to and more particularly pointed out in the specification and claim.

In the accompanying drawing forming a part of this application,

Figure 1 is a front elevation of an auto mirror with my improved bracket attached thereto, Figure 2 is a top plan view thereof, Figure 3 is an enlarged horizontal section as seen on line 3—3 of Figure 4, showing more particularly the mounting of the mirror bracket on the door of an automobile, Figure 4 is a vertical sectional view taken substantially on line 4—4 of Figure 5, showing more particularly the mounting of the bracket on the door of an automobile, Figure 5 is a vertical sectional view taken on line 5—5 of Figure 4, Figure 6 is a detailed sectional view with parts in elevation showing more particularly a portion of the threaded arm, previous to the heading or upsetting of the end thereof to receive the door locking bracket, and Figure 7 is a sectional view through the nut employed in connection with the fastening of the device in position, previous to the heading or the upsetting of the one end thereof to receive the outer shell or hood.

In describing the invention, I shall refer to the drawing in which similar reference characters designate corresponding parts throughout the several views and in which the numeral 1 designates a mirror of the rear-view type for use externally of the body of an automobile, comprising the usual reflecting surface and a frame therefor, there being a stem projecting rearwardly from the frame which is adjustably supported in the housing 3, the latter being locked adjustably as at 4 to an arm 5. While I have shown in the drawing a rectangular shaped mirror it is, of course, understood that any shaped mirror may be used and, of course, any conventional type of adjusting means for the support of the mirror on the rod may also be used, although that illustrated constitutes the subject matter of my invention covered in a copending application.

As aforesaid, my invention contemplates the provision of a new type of bracket to support the arm 5 on the body of an automobile. Some difficulties have been encountered with the present types of supports for mirrors, for the reason that many of them require the boring of holes in the body, the use of screws, or where such is not required, the elements used are of the type that damage the body of the automobile or are of such complexity that when the device is not in use, there is great liability of loss of parts.

To this end, I provide a very simple structure which will overcome the difficulties heretofore encountered. The inner end of the arm 5 is threaded, as shown at 6, but the threads stop short of the end which is designated by the numeral 7. Applied to this end 7 is a bracket 9 of U-shape, the same being securely held in position by the upsetting of the end 7 to form a head 8. This U-shaped bracket 9 has the rear engaging arm 10 bifurcated to form the fingers or arms 11. It is this particular bracket which is adapted to engage the thinned portion of a door D of an automobile, the body of which is designated by the numeral B.

With the bracket engaged over the thinned portion of the door, as shown in Figures 3 and 4 of the drawing, it is essential to lock the same in such position so that the mirror will remain in its secured position but capable of removal when desired. In carrying out this idea with few and simple parts, I provide an elongated nut or the like 12 which is threadedly engaged with the threaded portion 6 of the arm 5. The one end of said nut has an extension 14 thereon which is adapted to loosely receive thereover a shell or hood 15. After applying the shell or hood over the extended portion 14 of the nut, the end of said extended portion is upset to form a head or retaining element 16. By so doing, a groove or the like 17 is created within which the shell or hood 15 is loosely held in position on said nut. Obviously the application of the hood or shell 15 to the nut 12 is accomplished before the bracket 9 is applied to the end of the arm 5, so that said nut 12 may be properly applied to the threaded portion 6.

When the structure is so assembled and it is desired to apply the device to use, the nut 12 is moved counter-clockwise on the threaded portion 6 of the arm 5 and the bracket 9 is clipped or engaged on the door D in the fashion shown in Figures 3 and 4. Thereupon the nut 12 is turned clockwise which causes the shell or hood 15 to move forwardly with respect to the arm 5 while the bracket 9 is moved rearwardly with respect to the shell, thus permitting the bracket, or the rear fingers 11 thereof, and the shell to act as jaws biting tightly against the door and obviously securing the arm 5 and the elements carried thereon in position. In order to facilitate the turning of the nut 12, I provide an external rib 18 on said nut which is hexagonally designed to enable the same to be readily turned by hand or with a wrench or other similar instrument.

The only element which comes in contact with the external surface of the door is the edge of the hood or shell 15 and if desired said edge may be covered with felt, rubber or other similar material (not shown) to protect the paint surface of the door, or a strip of such material inserted between the surface and the edge of the hood.

From the foregoing description of the construction of my improved bracket, the method of assembling same and applying the device to use will be readily understood. Moreover, it will be seen that I have provided a simple, inexpensive and efficient means for carrying out the objects of the invention.

While I have particularly described the elements best adapted to perform the functions set forth, it is apparent that various changes in form, proportion and in the minor details of construction may be resorted to, without departing from the spirit or sacrificing any of the principles of the invention.

Having thus described my invention, what I claim is:

A mounting for automobile mirrors comprising a rod having a threaded portion spaced from its inner end, the said inner end being unthreaded and forming a neck, a U-shaped bracket for straddling a side edge portion of a door, said bracket being disposed transversely of said rod and having inner and outer arms, the inner arm being formed with an opening through which the neck passes, the extremity of said neck being formed with a head firmly holding the bracket to the rod, an elongated nut threaded upon the threaded portion of said rod and intermediate its length being formed with an outstanding circumferential shoulder for engagement by a wrench to turn the nut, the portion of the nut between said shoulder and its inner end constituting an extension for the nut, a hollow hood disposed about said bracket and having opposed walls engaging said bracket to prevent turning of the bracket and the hood relative to each other, said hood having an opening loosely receiving the extension of said nut, and the end of said extension being formed with an annular head disposed within the hood and holding the hood in place about the extension between its head and the shoulder of the nut.

HARRY GOLDEN.